United States Patent [19]

Shirakawa et al.

[11] 4,262,318

[45] Apr. 14, 1981

[54] ZINC-OXIDE SURGE ARRESTER

[75] Inventors: Shingo Shirakawa; Yutaka Kitano; Yoshio Kawai, all of Hitachi; Siniti Owada, Katsuta, all of Japan

[73] Assignee: Hitachi, Ltd., Japan

[21] Appl. No.: 16,825

[22] Filed: Mar. 2, 1979

[30] Foreign Application Priority Data

Mar. 3, 1978 [JP] Japan ................................ 53-23527

[51] Int. Cl.[3] ................................................ H02H 9/04

[52] U.S. Cl. ....................................... 361/127; 338/21

[58] Field of Search ............... 361/127, 126, 120, 128, 361/117, 130; 338/21, 20, 7, 51, 52, 54, 56-58, 204, 319, 320; 315/36; 313/325, 297, 296, 299, 300

[56] References Cited

U.S. PATENT DOCUMENTS

| | | | |
|---|---|---|---|
| 3,227,983 | 1/1966 | Braun | 361/126 X |
| 3,560,794 | 2/1971 | Christener | 315/36 |
| 3,648,212 | 3/1972 | Kuwabara et al. | 338/53 |
| 3,821,608 | 6/1974 | Johansson et al. | 361/127 |
| 4,153,921 | 5/1979 | Kresge et al. | 338/21 X |

*Primary Examiner*—Patrick R. Salce

*Attorney, Agent, or Firm*—Craig and Antonelli

[57] ABSTRACT

A zinc-oxide surge arrester, in which a plurality of zinc-oxide elements each having a through hole at a central portion are stacked in such a manner that an insulating supporting rod having at least one fixed end is inserted in the through hole of each element, can increase the heat transfer area of the element and simplify the supporting structure.

7 Claims, 11 Drawing Figures

ZINC-OXIDE SURGE ARRESTER

The present invention relates to zinc-oxide surge arresters employing zinc-oxide elements each made up of a sinter which contains zinc-oxide as the main component.

Conventional surge arresters have been developed mainly in the field of a surge arrester having series gaps which is formed of the combination of series gaps and arrester elements in series. In the surge arrester of this type, a dynamic current arc is driven to narrow gaps within an arc-extinguishing chamber containing the series gaps and the arc temperature is raised to break the arc. The above surge arrester is called a valve type surge arrester, and has the arrester elements mainly composed of silicon carbide or SiC.

A surge arrester having no gap has been also developed which employs as the arrester element a zinc-oxide element in place of the silicon carbide element. The zinc-oxide element is made in the following manner. A small quantity of $Bi_2O_3$, CoO, MnO, or $Sb_2O_3$ is added to and mixed with zinc-oxide (ZnO) which is the main component. The mixture is pressed into a predetermined form and then heated at high temperatures above 1,000° C. The zinc-oxide element thus obtained has a voltage versus current characteristic or V-I characteristic such that an applied voltage is maintained at an approximately constant value in a wider range of current as compared with the silicon carbide element.

Since the zinc-oxide surge arrester utilizes the extreme non-linearity in the V-I characteristic of the zinc-oxide element, the life of the arrester depends on the voltage application rate of the zinc-oxide element.

Further, the V-I characteristic of the zinc-oxide element has a temperature dependency such as shown in FIG. 1 of the accompanying drawings. As is seen in FIG. 1, the element has the extremely non-linear characteristic in an ordinary use, however, when the temperature of the element is raised to above 150° C., the leakage current of the element is increased from 1 mA at ordinary temperatures to more than 5 mA, and there is a certain danger of the element suffering from the thermal runaway. Such a state is produced when the surge arrester absorbs a multiple lightning surge or the multiple switching surge. Therefore, in order to maintain such a V-I characteristic that an applied voltage is kept at a constant value in a wider range of current, it is very important to suppress the temperature rise of the element at a time when the element absorbs the multiple surge.

An object of the present invention is to provide a zinc-oxide surge arrester which is excellent in temperature recovery characteristic after the absorption of a multiple surge.

Another object of the present invention is to provide a zinc-oxide surge arrester which can readily support a plurality of stacked zinc-oxide elements.

The zinc-oxide surge arrester according to the present invention includes zinc-oxide elements of an approximately cylindrical shape which are placed in a hermetically sealed vessel containing therein an insulating medium. The hollow portion of the zinc-oxide element is open to the surroundings, and inner and outer side faces of the element is exposed to the insulating medium. The zinc-oxide element of the above shape is larger in contact area with the insulating medium as compared with conventional disk-shaped zinc-oxide elements. For example, if the area with which the stacked zinc-oxide elements are in contact with each other is made equal, an element having the cylindrical shape and a capacity can be about 1.5 times as large in contact area with the insulating medium as a conventional disk-shaped element having the same capacity. Accordingly, the temperature recovery characteristic after the absorption of the multiple surge can be improved, and thus the aforementioned object can be attained.

The present invention will be apparent from the following detailed description taken in conjunction with the accompanying drawings, in which.

Figure 1:
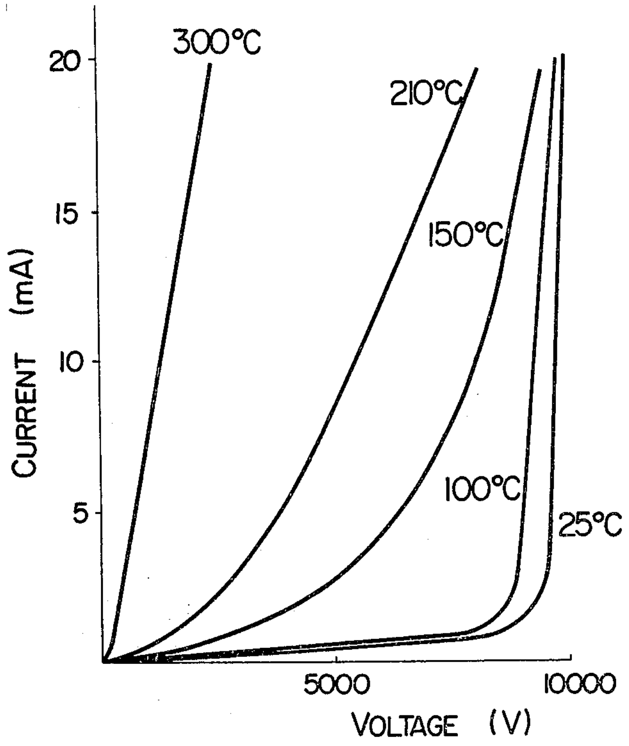
FIG. 1 shows a voltage versus current characteristic, plotted for temperature as parameter, of a zinc-oxide element used in the present invention.
Figure 2:
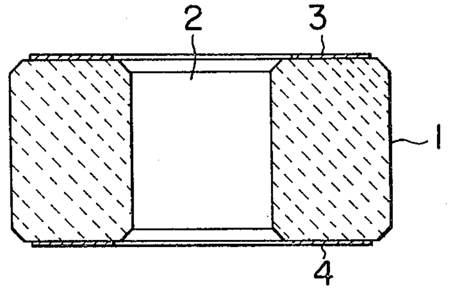
FIG. 2 is a sectional view of a zinc-oxide element according to an embodiment of the present invention.

FIG. 2 shows a zinc-oxide element 1 according to an embodiment of the present invention. The element 1 is fabricated in the following manner. After a small quantity of $Bi_2O_3$, CoO, MnO, $Sb_2O_3$, or the like has been added to and mixed with ZnO which is the main component, the mixture is pressed into the form of a cylinder and is heated at high temperatures. As seen in FIG. 2, the element 1 has such a through hole 2 as passing through a central portion of the element in the axial direction. Further, on both end faces of the element in the axial direction, there are provided electrodes 3 and 4 formed through metal evaporation techniques or the like. The inner diameter of the electrodes is made greater than the diameter of the through hole by several millimeters. The element provided with electrodes of such an inner diameter is suitable for use in a zinc-oxide surge arrester as described later and shown in FIG. 4. Now, let us compare a conventional element with the element 1 shown in FIG. 2 in a rated capacity. The conventional element has an outer diameter of 85 mm because of the form of a disk, while the element 1 shown in FIG. 2 may have an outer diameter of 93 mm and an inner diameter of 31 mm. Accordingly, though the area of the end face perpendicular to the axis is the same in both elements, the surface area of side face of the element 1 is greater than that of the conventional element by about 48%.

Figure 3:
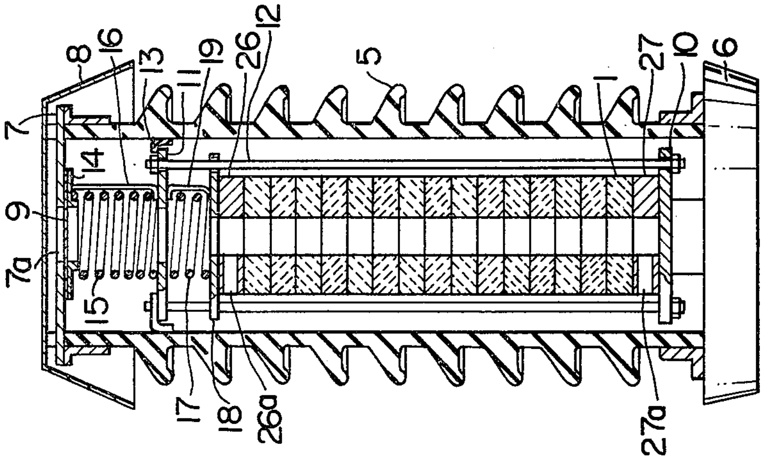
FIG. 3 is a longitudinal sectional view of a zinc-oxide surge arrester according to an embodiment of the present invention.

FIG. 3 shows a zinc-oxide surge arrester employing the element 1 shown in FIG. 2. Referring to FIG. 3, both ends of an insulating tube 5 are sealed with an end cover 7 and another end cover 6 to form a hermetically sealed vessel. The end cover 7 is connected with a main circuit and forms a high tension conductor applied with a high voltage, while, the end cover 6 is applied with ground potential. The inner part of the hermetically sealed vessel is filled with an insulating medium such as N2 gas, $SF_6$ gas, or an insulating oil. The end cover 7 is provided with a shielding body 8 in an arrangement so as to surround the end cover. The shielding body 8 guides the insulating medium from a pressure releasing plate 9 which seals an aperture of the end cover 7. Namely, the pressure releasing plate 9 is exploded when the internal pressure of the insulating tube 5 increased abnormally due to dielectric breakdown of the elements 1 etc. thereby reducing the internal pressure by releasing the insulating medium through the shielding body 8, whereby the insulating tube 5 is protected. A lower terminal plate 10 is fixed to the end cover 6. A plurality of elements 1 as shown in FIG. 2 are stacked on the lower terminal plate 10 through a cylindrical conductor 27 having a hole 27a. On the upper end of the stacked elements, there are successively placed a cylindrical conductor 26 having a hole 26a, an upper terminal plate 18, a spring 17, and an intermediate plate 11. The stacked elements are fixed by a plurality of insulating rods 12 which bridge the lower terminal plate 10 and the intermediate plate 11. The insulating rods 12 are arranged with a predetermined spacing in the vicinity of the outer circumference of the stacked elements. A plurality of crossarm braces 13 such as press boards are fixed to the intermediate plate 11 and are in contact with the inner surface of the insulating tube 5 to prevent the deviation of the intermediate plate 11. Further, the upper terminal plate 18 and the intermediate plate 11 are free to move along the insulating rods 12 toward the lower terminal plate 10. A ring-like conductor 14 for fixing the pressure releasing plate 9 is fixed to the inner face of the end cover 7, and a spring 15 is arranged between the conductor 14 and the intermediate plate 11. The contact pressure applied among the contiguous elements 1 is mainly given by the spring 17. While, the spring 15 has such an action as reducing the tension applied to the insulating rods 12 by the spring 17. Conductive, elastic bodies 16 and 19 are provided in the vicinity of the springs 15 and 17, respectively. The electrical connection between the intermediate plate 11 and the conductor 14 is made by the elastic body 16, while, the electrical connection between the intermediate plate 11 and the upper terminal plate 18 is made by the elastic body 19.

Figure 5:
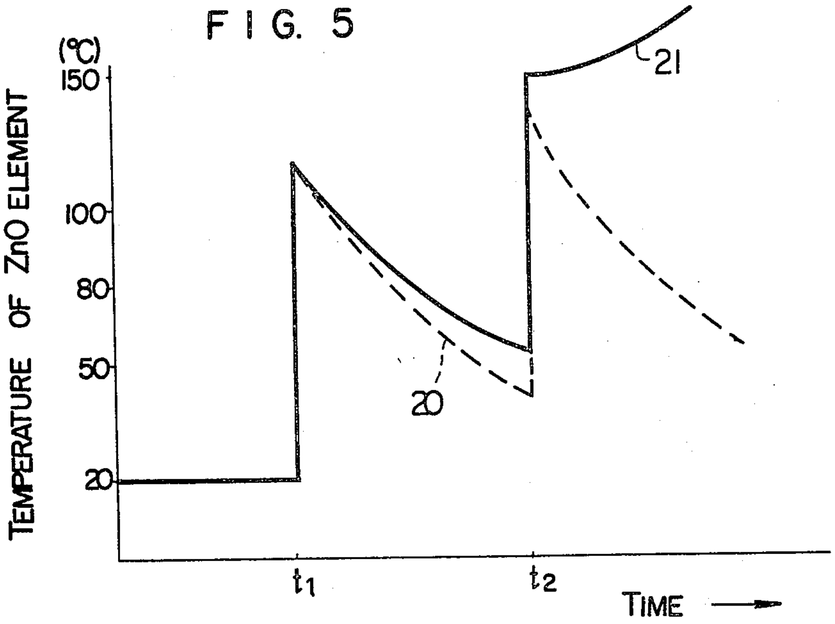
FIG. 5 is a graph showing a temperature recovery characteristic at a time when the multiple surge is absorbed.

In the above-mentioned construction, the through hole 2 of each element 1 is filled with the insulating medium. Accordingly, the heat transfer from the inner and outer face of the element 1 to the insulating medium suppresses the temperature rise in the element 1. Specifically, when the $SF_6$ gas or an insulating oil is employed as the insulating medium, the insulating medium will circulate mainly in the system (the through hole 2 of the element 1→ the hole 26a of the cylindrical conductor 26→ the hole 27a of the cylindrical conductor 27→ the through hole 2 of the element 1) due to the heat emission from the elements 1. In this case, the temperature rise in the element can be suppressed effectively. Therefore, even if, at the time t, and $t_2$, the elements absorb the surge current of the multiple surge and the temperature of the elements is, as shown in FIG. 5, rapidly raised, the element is cooled in a manner as indicated by a recovery curve 20, and such a thermal runaway as indicated by another recovery curve 21 can be prevented. Needless to say, it is extremely important to prevent the thermal runaway of a zinc-oxide surge arrester having no series gap. In the above embodiment, the prevention of the thermal runaway is attained by only changing the shape of the element 1. Further, there can be formed a structure having a cooling fin in the vicinity of the upper terminal plate 18 and such a structure that a tube made of an insulator and filled with a coolant is inserted in the through hole 2 of the element 1, as other embodiments of the present invention.

Figure 4:
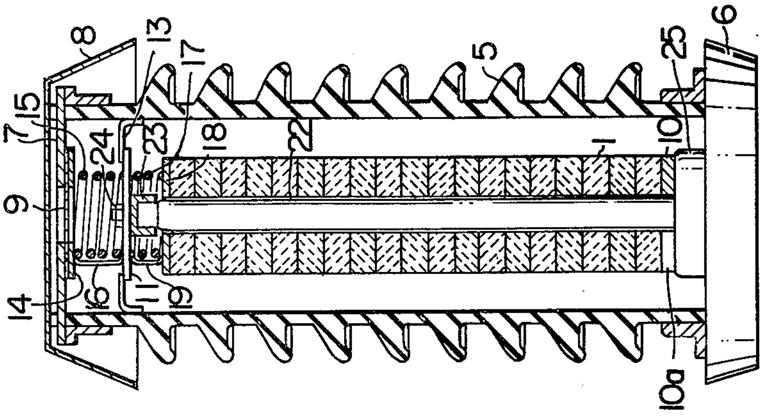
FIG. 4 is a longitudinal sectional view of a zinc-oxide surge arrester according to another embodiment of the present invention.

FIG. 4 shows a zinc-oxide surge arrester according to another embodiment of the present invention. Like reference numerals are given to like parts in FIGS. 3 and 4. The arrester shown in FIG. 4 is different mainly in structure for supporting the elements 1 from that shown in FIG. 3. Referring to FIG. 4, on a base 25 fixed to the end cover 6, there are stacked the lower terminal plate 10, a plurality of elements 1 and the upper terminal plate 18. The elements 1 are supported by an insulating supporting rod 22, the lower end of which is fixed to the base 25, while, the upper end protrudes from the upper terminal plate 18, and the protruding portion is coupled with connecting fittings 23 through adhesives or screw connection. The crossarm braces 13 is fixed to the intermediate plate 11 which is coupled with the connecting fittings 23 by a nut 24. The crossarm braces 13 is further in contact with the inner surface of the insulating tube 5 to prevent the deviation of the upper end of the insulating supporting rod 22. The spring 17 is arranged between the intermediate plate 11 and the upper terminal plate 18, and applies a contact pressure among the contiguous elements 1. Further, the intermediate plate 11 and the upper terminal plate 18 are electrically connected by means of an elastic connecting conductor 19 such as a flat spring. The spring 15 is arranged between the the intermediate plate 11 and the conductor 14, and can reduce the tension which is applied to the insulating supporting rod 22 by the spring 17. When it is desired that the spring 15 also applies a contact pressure among the contiguous elements 1, the intermediate plate 11 is required to fit the insulating supporting rod 22 in a manner as being free to slide along the rod 22 so that the plate 11 can move toward the lower terminal plate 10. The intermediate plate 11 and the conductor 14 are also electrically connected by the elastic connecting conductor 16. There is provided between the wall face of the through hole 2 of the element 1 and the insulating supporting rod 22 a clearance of about 1 mm which is continously extended in the direction of the axis of the rod 22.

In the zinc-oxide surge arrester shown in FIG. 4, the elements 1, are cooled by the insulating medium existing in the through hole 2 of each element 1, as in the arrester shown in FIG. 3. Further, the arrester shown in FIG. 4 is very simple in the structure for supporting the elements 1, since the stacked elements 1 can be supported by a single rod 22. Furthermore, since the inner diameter of the electrodes 3 and 4 is, as shown in FIG. 2, made greater than the diameter of the through hole 2, the use of the insulating supporting rod 22 will not cause any trouble concerning insulation. Moreover, since the insulating supporting rod 22 is inserted in the through hole 2 for cooling, such conductors in the insulating tube 5 as applied with a high voltage can be made small in diameter. For example, the diameter of the intermediate plate 11 can be made approximately equal to the outer diameter of the element 1. This is effective in reducing the diameter of the insulating tube 5. Further, the spacing between the circumference of the element 1 and the intermediate plate 11 and the inner surface of the insulating tube 5 can also be made large by reducing the outer diameter of the element 1 and the plate 11. With such a large spacing, the elements 1 are not readily affected by a change in surface potential distribution of the insulating tube 5 at a time when the tube 5 is contaminated.

Figure 6:
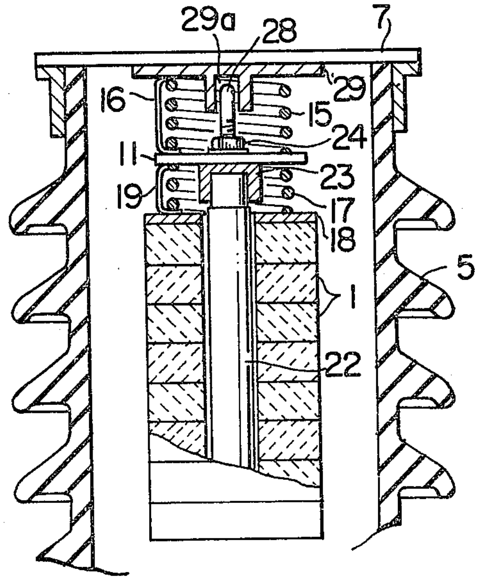
FIG. 6 is a fragmentary sectional view of a zinc-oxide surge arrester according to a further embodiment of the present invention.

In the structure shown in FIG. 4, the upper end of the insulating supporting rod 22 is supported by the crossarm braces 13. However, the upper end of the rod 22 may be supported as shown in FIG. 6. That is, in the embodiment shown in FIG. 6, the connecting fittings 23 has a head 28 of a rod shape which protrudes upwardly from the intermediate plate 11. The head 28 fits a recess 29*a* of receiving fittings 29 fixed to the end cover 7. The upper end of the insulating supporting rod 22 is supported by means of the fitting between the rod-shaped heat 28 and the recess 29*a*, and therefore does not vibrate. In such a structure, the crossarm braces 13 as shown in FIG. 3 can be dispensed with.

The embodiments shown in FIG. 3, 4, and 6 are called an insulator-type zinc-oxide surge arrester, because the hermetically sealed vessel including therein the zinc-oxide elements is formed of an insulating tube 5. On the other hand, there has been known a tank-type zinc-oxide surge arrester, in which the hermetically sealed vessel is formed of a metal tank. There will be explained hereinafter various embodiments of the tank-type zinc-oxide surge arrester according to the present invention.

In general, the metal tank of the tank-type zinc-oxide surge arrester is applied with earth potential, namely, grounded. Therefore, the crossarm braces 13 shown in FIGS. 3 and 4 will produce difficulties with respect to electric insulation. However, the structures shown in FIGS. 3 and 4 excepting the crossarm braces 13 are applicable to the tank-type zinc-oxide surge arrester.

Figure 7:
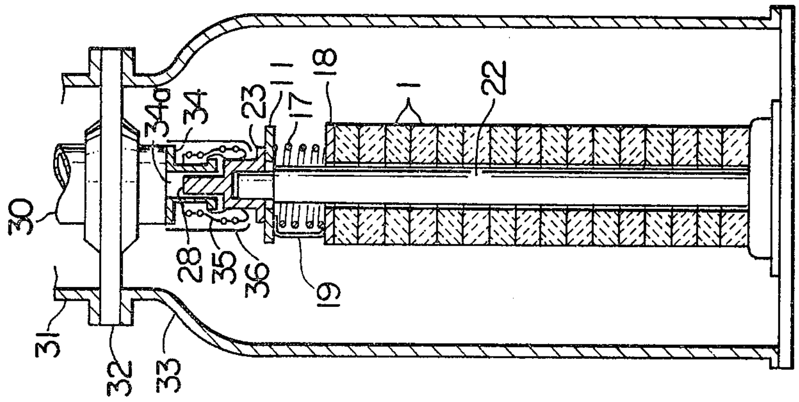
FIG. 7 is a longitudinal sectional view of a zinc-oxide surge arrester according to an additional embodiment of the present invention.

FIG. 7 shows an example of the tank-type zinc-oxide surge arrester according to the present invention. Referring FIG. 7, a vessel 31 containing a high tension conductor 30 connected with a main circuit is connected through an insulating spacer 32 with a metal tank 33. A supporting conductor 34 having a recess 34*a* for fitting is fixed to the high tension conductor 30 on the side of the metal tank 33 with respect to the insulating spacer 32. The elements 1 are supported by the insulating supporting rod 22 placed in the through hole 2, as in the embodiment shown in FIG. 6. The upper end of the rod 22 is connected with the connecting fittings 23 through screw coupling, after the spring 17 and the intermediate plate 11 have been placed on the upper terminal plate 18. The spring 17 is compressed through the screw-coupling between the rod 22 and the connecting fittings 23, and thus a contact pressure is applied between contiguous elements. A protruding rod 28 of the connecting fittings 23 fits the recess 34*a* of the supporting conductor 34, to support the upper end of the rod 22. Further, the connecting conductor 34 is provided with a contact 35, by which the connecting conductor 34 and the connecting fittings 23 are electrically connected. The contact 35 is surrounded with a shielding cylinder 36 to suppress the disturbance of electric field.

Figure 8:
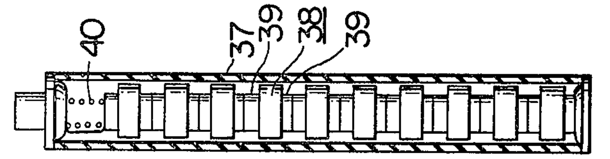
FIG. 8 is a longitudinal sectional view for showing another example of the main part of the arrester shown in FIG. 7.

FIG. 8 shows another example of means for supporting the stacked elements. The supporting means shown in FIG. 8 is made up of an insulating cylinder 37 and a plurality of ceramic capacitor elements 38 stacked in the cylinder 37. The ceramic capacitor element 38 includes terminal plates 39 connected to both surfaces of a ceramic block, and a contact pressure is applied between contiguous elements 38 by the action of a spring 40. The supporting means as above can be employed in place of the insulating supporting rod 22 shown in FIG. 7. Since, in the tank-type zinc-oxide surge arrester, the tank 33 is grounded, the potential distribution in the tank is disturbed, and an applied high voltage is not always uniformly alloted to each zinc-oxide element. However, if the supporting means shown in FIG. 8 is employed which is a voltage dividing capacitor device, the disturbance in potential distribution is improved by the capacitor elements 38, and the applied high voltage is uniformly alloted to each zinc-oxide element.

Figure 9:
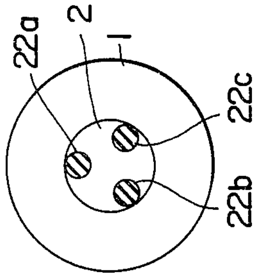
FIG. 9 is a transverse sectional view for showing still another example of the main part of the arrester shown in FIG. 7.

FIG. 9 shows a further example of means for supporting the stacked elements 1. In this example, a plurality of insulating supporting rods 22*a*, 22*b* and 22*c* are arranged in the through hole 2 of the zinc-oxide element 1. The supporting means as above makes it possible to fill the through hole 2 with a larger quantity of insulating medium, and the cooling effect is further enhanced. Incidentally, the supporting means shown in FIGS. 8 and 9 are also applicable to the previously-mentioned insulator-type zinc-oxide surge arrester.

Figure 10:
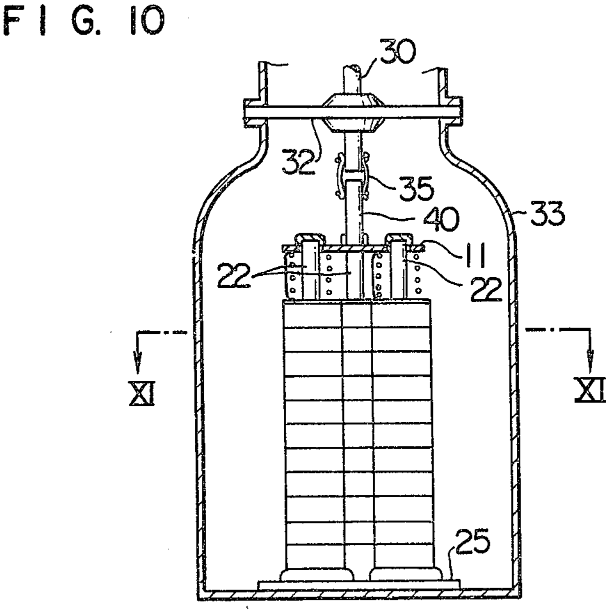
FIG. 10 is a longitudinal sectional view of a zinc-oxide surge arrester according to still a further embodiment of the present invention.
Figure 11:
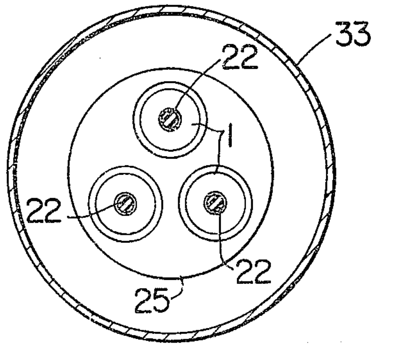
FIG. 11 is a sectional view of the arrester, taken along the line XI—XI in FIG. 10.

FIG. 10 shows a still further embodiment of the tank-type zinc-oxide surge arrester according to the present invention. As can be seen from FIG. 11 which is a sectional view taken along the line XI—XI in FIG. 10, a plurality of groups of stacked elements as shown in FIG. 7 are arranged in the tank 33, and the groups are supported by respective insulating supporting rods 22. However, the intermediate plate 11 is commonly employed for, for example, three groups. A common conductor 40 is fixed to the common intermediate plate 11, and is electrically connected through the contact 35 with the high tension conductor 30. In this embodiment, the upper ends of three insulating supporting rods 22 can be strongly supported, since three rods are tightly coupled with a single intermediate plate 11. Three groups of elements 1 may be connected in parallel between the base 25 and the common intermediate plate 11, or may be connected in series.

For the tank-type zinc-oxide surge arrester, the tank 33 is sometimes placed horizontally. The arrester shown in FIG. 7 can be placed horizontally without producing any trouble, since both ends of the insulating supporting rod 22 are firmly supported. The embodiment shown in FIG. 10 can be placed horizontally, if such a supporting structure as shown in FIG. 7 is employed between the common conductor 30 and the high tension conductor 40.

In the tank-type zinc-oxide surge arrester, it is possible to form at a side portion of the tank 33 a flow path for forced circulation of the insulating medium, because the tank is grounded and the inside of the tank is filled with the insulating medium. In this case, if the supporting structures shown in FIGS. 3 and 9 are employed, the cooling effect of the insulating medium on the elements 1 will be the more enhanced.

What we claim is:

1. A zinc-oxide surge arrester comprising:

a hermetically sealed vessel containing therein an insulating medium, said vessel being formed by sealing both ends of an insulating tube with end covers;

a group of elements made up of a plurality of zinc-oxide elements stacked in a direction, said elements having a through hole at an approximately central portion of said elements, said element including electrodes provided on both end faces perpendicular to said direction, said electrodes having an inner diameter greater than a diameter of said through hole;

a spring means for applying a contact pressure between elements included in said group of elements;

a rod-shaped insulating supporting means arranged in a series of through holes of said elements in such a manner that said through holes of at least a part of said elements form an inflowing part of said insulating medium continuously in said direction, at least one end of said rod-shaped insulating supporting means being fixed to said hermetically sealed vessel;

a means fixed to the other end of said rod-shaped insulating supporting means; and a second insulating supporting means fixed to said fixed means and placed in contact with the inner surface of said insulating tube, said second insulating supporting means supporting said other end of said rod-shaped insulating supporting means.

2. A zinc-oxide surge arrester according to claim 1, wherein said spring means is arranged between said fixed means and one end of said group of elements on the side of said other end of said rod-shaped insulating supporting means.

3. A zinc-oxide surge arrester comprising:

a hermetically sealed vessel containing therein an insulating medium;

at least one group of elements made up of a plurality of zinc-oxide elements stacked in a direction, said elements having a through hole at an approximately central portion of said elements, said element including electrodes provided on both end faces perpendicular to said direction, said electrodes having an inner diameter greater than a diameter of said through hole;

a spring means for applying a contact pressure between elements included in said group of elements;

a rod-shaped insulating supporting means arranged in a series of through holes of said elements in such a manner that said through holes of at least a part of said elements form an inflowing part of said insulating medium continuously in said direction, at least one end of said rod-shaped insulating supporting means being fixed to said hermetically sealed vessel;

a means fixed to the other end of said rod-shaped insulating supporting means and having a first fitting part;

a high tension conductor connected electrically with one end of said group of elements on the side of said other end of said rod-shaped insulating supporting means, said connection being made in said hermetically sealed vessel; and a supporting means fixed to said high tension conductor and having a second fitting part, said second fitting part fitting said first fitting part.

4. A zinc-oxide surge arrester according to claim 3, wherein said fixed means and said supporting means are electrically connected by a contact provided around said fixed means and said supporting means.

5. A zinc-oxide surge arrester according to claim 3, wherein a plurality of groups of elements are juxtaposed, and said fixed means is formed of a single plate fixed to said other ends of respective rod-shaped insulating supporting means of said groups of elements.

6. A zinc-oxide surge arrester comprising:

a hermetically sealed vessel containing therein an insulating medium;

a group of elements made up of a plurality of zinc-oxide elements stacked in a direction, said elements having a through hole at an approximately central portion of said elements, said elements including electrodes provided on both end faces perpendicular to said direction, said electrodes having an inner diameter greater than a diameter of said through hole;

rod-shaped insulating supporting means arranged in a series of through holes of said elements in such a manner that said through holes of at least a part of said elements form an inflowing part of said insulating medium continuously in said direction, one end of said rod-shaped insulating supporting means being fixed to said hermetically sealed vessel and the other end of said rod-shaped insulating supporting means being protruded from the end surface of said group of elements;

an intermediate plate fixed to the other end of said rod-shaped insulating supporting means;

a terminal plate placed on the end surface of said group of elements from which the other end of said rod-shaped insulating supporting means is protruded; and first spring means disposed between said intermediate plate and said terminal plate for applying a contact pressure between elements included in said group of elements.

7. A zinc-oxide surge arrester according to claim 6, further comprising second spring means, said hermetically sealed vessel being formed by sealing both ends of an insulating tube with end covers, and said second spring means being disposed between said intermediate plate and said end cover which opposes to said intermediate plate.

* * * * *